United States Patent
Michelson

(10) Patent No.: US 10,317,975 B2
(45) Date of Patent: Jun. 11, 2019

(54) SYSTEMS AND METHODS FOR PROVIDING INFORMATION REGARDING RESOURCE CONSUMPTION OR ENVIRONMENTAL IMPACT ASSOCIATED WITH USAGE OF A COMPUTER

(71) Applicant: Hewlett-Packard Development Company, L.P., Houston, TX (US)

(72) Inventor: Bruce David Michelson, Concord, FL (US)

(73) Assignee: Hewlett-Packard Development Company, L.P., Spring, TX (US)

(*) Notice: Subject to any disclaimer, the term of this patent is extended or adjusted under 35 U.S.C. 154(b) by 215 days.

(21) Appl. No.: 15/357,422

(22) Filed: Nov. 21, 2016

(65) Prior Publication Data

US 2017/0068299 A1 Mar. 9, 2017

Related U.S. Application Data

(63) Continuation of application No. 13/055,757, filed as application No. PCT/US2008/073668 on Aug. 20, 2008, now Pat. No. 9,535,813.

(51) Int. Cl.
*G06F 1/32* (2019.01)
*G06F 1/3206* (2019.01)
(Continued)

(52) U.S. Cl.
CPC .......... *G06F 1/3206* (2013.01); *G06F 1/3218* (2013.01); *G06F 1/3225* (2013.01);
(Continued)

(58) Field of Classification Search
CPC ........ G06F 11/30; G06F 11/34; G06F 1/3206; G06F 1/3058; G06F 1/3086; G06F 1/3218; G06F 1/3225; G06Q 10/06
See application file for complete search history.

(56) References Cited

U.S. PATENT DOCUMENTS

| 5,153,837 A | 10/1992 | Shaffer et al. |
| 5,754,870 A | 5/1998 | Pollard et al. |

(Continued)

FOREIGN PATENT DOCUMENTS

| CN | 1435789 A | 8/2003 |
| CN | 1464390 | 12/2003 |

(Continued)

OTHER PUBLICATIONS

Chinese Office Action dated Apr. 24, 2014 cited in Appl. No. 200880130805.0; 11 pages.
(Continued)

*Primary Examiner* — Henry Tsai
*Assistant Examiner* — Christopher Daley
(74) *Attorney, Agent, or Firm* — International IP Law Group

(57) ABSTRACT

In one embodiment, a system and a method pertain to monitoring on the computing device resource consumption, storing resource consumption data obtained from the monitoring, receiving a request from the user for information regarding resource consumption or environmental impact associated with the user's operation of the computing device, and presenting to the user information regarding resource consumption or environmental impact.

18 Claims, 6 Drawing Sheets

(51) Int. Cl.
*G06F 11/30* (2006.01)
*G06Q 10/06* (2012.01)
*G06F 1/3218* (2019.01)
*G06F 1/3225* (2019.01)
*G06F 11/34* (2006.01)

(52) U.S. Cl.
CPC ...... *G06F 11/3058* (2013.01); *G06F 11/3086* (2013.01); *G06Q 10/063* (2013.01); *G06F 11/3423* (2013.01)

(56) References Cited

U.S. PATENT DOCUMENTS

| | | | |
|---|---|---|---|
| 5,801,961 | A | 9/1998 | Moore et al. |
| 6,064,974 | A | 5/2000 | Broekhuijsen |
| 6,081,752 | A | 6/2000 | Benson, IV et al. |
| 6,509,911 | B1 | 1/2003 | Shimotono |
| 6,553,502 | B1 | 4/2003 | Hurd et al. |
| 6,782,343 | B2 * | 8/2004 | Hasper .............. G05B 15/02 702/136 |
| 6,965,833 | B2 | 11/2005 | Sakurai et al. |
| 7,356,770 | B1 | 4/2008 | Jackson |
| 7,366,933 | B1 | 4/2008 | Aharonian et al. |
| 7,440,871 | B2 * | 10/2008 | McConnell .......... G06Q 10/06 702/188 |
| 7,496,532 | B2 | 2/2009 | Johnson et al. |
| 9,535,813 | B2 * | 1/2017 | Michelson .......... G06F 11/3058 |
| 2004/0044476 | A1 * | 3/2004 | Miyamoto ............ G06Q 10/06 702/2 |
| 2005/0125701 | A1 * | 6/2005 | Hensbergen ........ G06F 1/3203 713/320 |
| 2005/0182612 | A1 | 8/2005 | Anderson et al. |
| 2006/0026268 | A1 | 2/2006 | Sanda |
| 2006/0101293 | A1 | 5/2006 | Chandley et al. |
| 2006/0112375 | A1 | 5/2006 | Schneider |
| 2007/0252552 | A1 | 11/2007 | Walrath |
| 2008/0008508 | A1 | 1/2008 | Mizobuchi et al. |
| 2008/0255899 | A1 | 10/2008 | McConnell et al. |
| 2010/0017242 | A1 * | 1/2010 | Hamilton, II .......... G06Q 10/00 705/7.37 |
| 2012/0221314 | A1 | 8/2012 | Bourlatchkov et al. |

FOREIGN PATENT DOCUMENTS

| | | |
|---|---|---|
| CN | 1912801 A | 2/2007 |
| JP | 2001344132 | 12/2001 |
| JP | 2004330639 | 11/2004 |
| JP | 2006162424 | 6/2006 |
| JP | 2006171991 | 6/2006 |
| JP | 2007048219 | 2/2007 |
| WO | WO2002/097630 A3 | 12/2002 |
| WO | WO2007/076515 A3 | 7/2007 |

OTHER PUBLICATIONS

Examination Report Under Section 18(3) received in GB Application No. 1102846.1, dated Oct. 11, 2012, 2 pages.
Intellectual Property Office, Examination Report under Section 18(3), Appln No. GB1102846.1, dated Mar. 6, 2012, 3 p.
International Searching Authority, International Search Report and Written Opinion, Appln No. PCT/US2008/073668, dated May 20, 2009, pp. 10.

* cited by examiner

SYSTEMS AND METHODS FOR PROVIDING INFORMATION REGARDING RESOURCE CONSUMPTION OR ENVIRONMENTAL IMPACT ASSOCIATED WITH USAGE OF A COMPUTER

CROSS-REFERENCE TO RELATED APPLICATION

This application is a continuation of U.S. patent application Ser. No. 13/055,757, filed Jan. 25, 2011, which is the National Stage Application of PCT application PCT/US2008/073668, filed Aug. 20, 2008, the entire contents of which are hereby incorporated by reference as though fully set forth herein.

BACKGROUND

In the last several years, people have become more concerned with their resource consumption and its impact on the environment. Such concerns have reached new heights recently with a backdrop of spiking energy costs and seemingly endless discussions of global warming.

While most persons have a general appreciation of the impact that their actions have on resource consumption and the environment, many such persons do not appreciate the impact of their computer usage. Therefore, while a person may consider himself to be relatively environmentally conscious because he adheres to "green" practices, such as lowering the thermostat in winter and raising it in summer, he may still unknowingly consume unnecessary amounts of energy and other resources with his computer and its peripheral devices. In addition to lacking knowledge of the impact of their computer usage, such persons often do not know how to change their computer usage practices to reduce their consumption and the environmental impact associated with that usage.

BRIEF DESCRIPTION OF THE DRAWINGS

The disclosed systems and methods can be better understood with reference to the following drawings. The components in the drawings are not necessarily to scale.

DETAILED DESCRIPTION

As described above, many persons do not appreciate the impact of their computer usage in terms of resource consumption or environmental impact. Furthermore, such persons often do not know how to change their computer usage practices to reduce that consumption or environmental impact. Disclosed herein are computers that collect data pertaining to the user's operation of the computer and provide the user with an indication of the user's resource consumption and environmental impact. In some embodiments, the indication comprises a relatively simple graphical representation of how well or how poorly the user is doing in conserving resources, such as electricity and paper, and reducing his or her environmental impact. In some embodiments, the user can opt to receive recommendations regarding his or her computer usage practices that will reduce the user's resource consumption and environmental impact.

Figure 1:
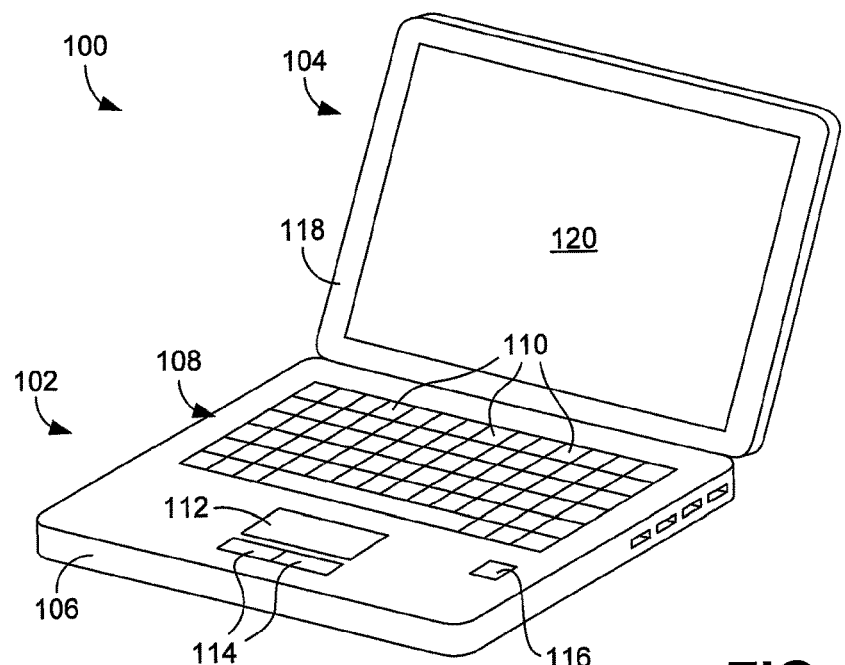
FIG. 1 is a perspective view of a first embodiment of a computing device configured to provide a user with information regarding resource consumption or environmental impact associated with use of the computing device.

Referring now in more detail to the drawings, in which like numerals indicate corresponding parts throughout the views, FIG. 1 illustrates a first computing device 100 in the form of a notebook or "laptop" computer. As indicated in FIG. 1, the computing device 100 includes a base 102 and a display 104 that are pivotally attached to each other. The base 102 includes an outer housing 106 that surrounds various internal components of the computing device 100, such as a processor, memory, hard drive, and the like. Also included in the base 102 are user input devices, including a keyboard 108 that comprises a plurality of keys 110, a touchpad 112, and selection buttons 114. In addition to those input devices, the base 102 further comprises a dedicated environmental or "green" key 116 that can be selected to obtain information regarding resource consumption or environmental impact associated with the user's operation of the computing device 100. In some embodiments, the key 116 can literally comprise a physical green-colored key to convey its association with environmental awareness and impact. The display 104 includes its own outer housing 118 that supports a display screen 120, such as a liquid crystal display (LCD) screen.

Figure 2:
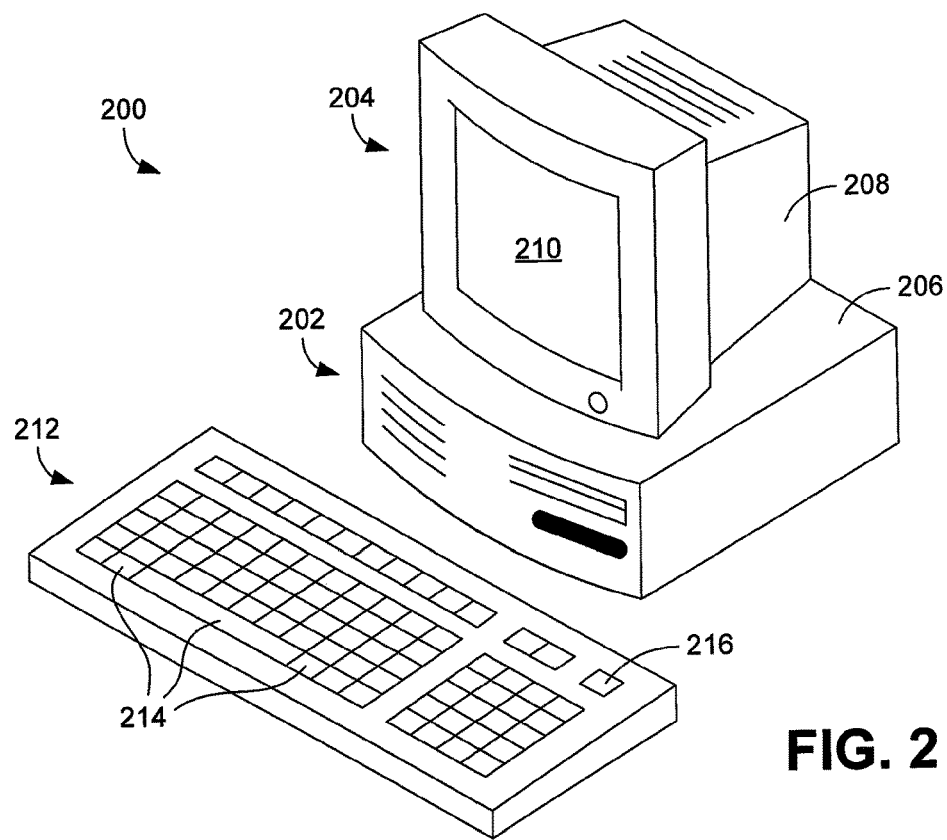
FIG. 2 is a perspective view of a second embodiment of a computing device configured to provide a user with information regarding resource consumption or environmental impact associated with use of the computing device.

FIG. 2 illustrates a second computing device 200 in the form of personal or "desktop" computer. As indicated in FIG. 2, the computing device 200 includes a main processing unit or "box" 202 and a display 204. The processing unit 202 includes an outer housing 206 that surrounds various internal components of the computing device 200, such as a processor, memory, hard drive, and the like. The display 204 includes its own outer housing 208 that supports a display screen 210, such as a cathode ray tube (CRT) or LCD screen.

In addition to the processing unit 202 and the display 204, the computing device 200 includes a keyboard 212 that comprises a plurality of keys 214, such as conventional alphanumeric and function keys. In addition to those keys 214, however, the keyboard 212 comprises a dedicated environmental key or green-key 216 that, like the key 116, can be green in color and can be selected to obtain information regarding resource consumption or environmental impact associated with the use of the computing device 200.

Figure 3:
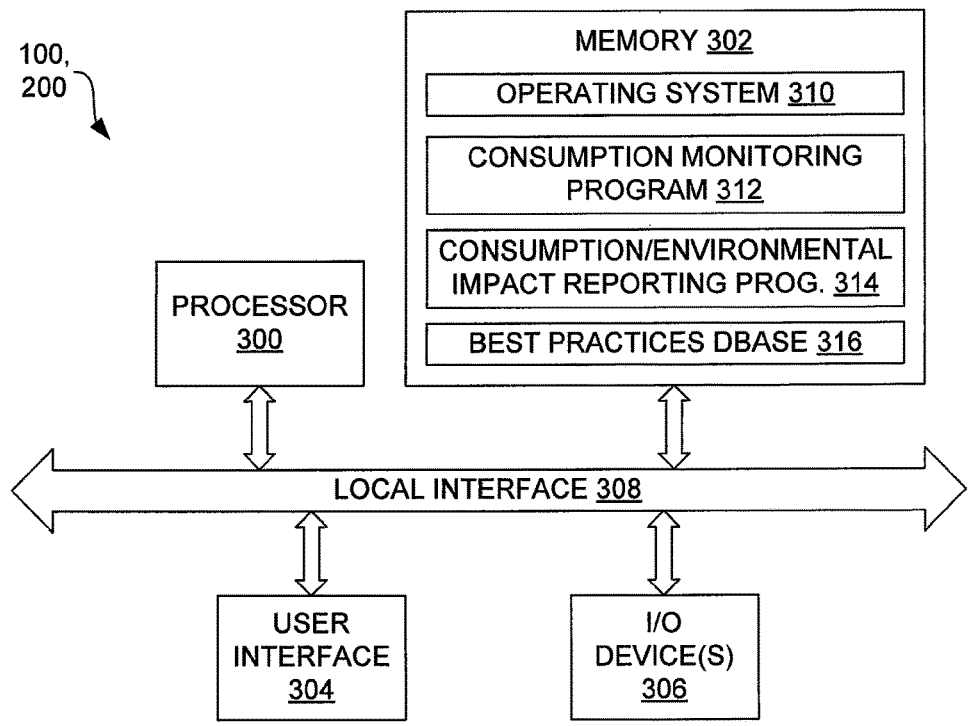
FIG. 3 is a block diagram illustrating an embodiment of an architecture for the computing devices of FIGS. 1 and 2.

FIG. 3 is a block diagram illustrating an example architecture for one or both of the computing devices 100 and 200. As indicated in FIG. 3 the computing device 100, 200 comprises a processor 300, memory 302, a user interface 304, and at least one I/O device 306, each of which is connected to a local interface 308.

The processor 300 can comprise a central processing unit (CPU) that controls overall operation of the computing device 100, 200. The memory 302 includes any one of or a combination of volatile memory elements (e.g., RAM) and nonvolatile memory elements (e.g., hard disk, ROM, tape, etc.) that store code that can be executed by the processor 300.

The user interface 304 comprises the components with which a user interacts with the computer 100, 200. The user interface 304 at least includes a keyboard that comprises a green-key, such as green-key 116 or 216. The one or more I/O devices 306 are adapted to facilitate communications with other devices and may include one or more communication components such as a modulator/demodulator (e.g., modem), wireless (e.g., radio frequency (RF)) transceiver, network card, etc.

The memory 302 comprises one or more computer-readable media that store various programs (i.e., logic) including an operating system 310, a consumption monitoring program 312, and a consumption/environmental impact reporting program 314. The operating system 310 controls the execution of other programs and provides scheduling, input-output control, file and data management, memory management, and communication control and related services. The consumption monitoring program 312 continuously monitors the consumption of resources associated with operation of the computing device 100, 200 and associated peripheral devices, such resources including, for example, electricity and paper.

Responsive to detection of selection of a green button 116 or 216, the reporting program 314 provides the user with information regarding resource consumption or environmental impact associated with the user's operation of the computing device 100, 200. As described below, that indication can comprise a relatively simple graphical representation of how well or poorly the user is doing in conserving energy or reducing his or her environment impact in association with his or her usage of the computing device 100, 200. In some embodiments, the determination as to how well the user is doing is made through comparison of the consumption data collected by the consumption monitoring program 312 and data contained in a best practices database 316 that specifies the practices that are considered to be best in terms of resource conservation or environmental friendliness.

Figure 4:
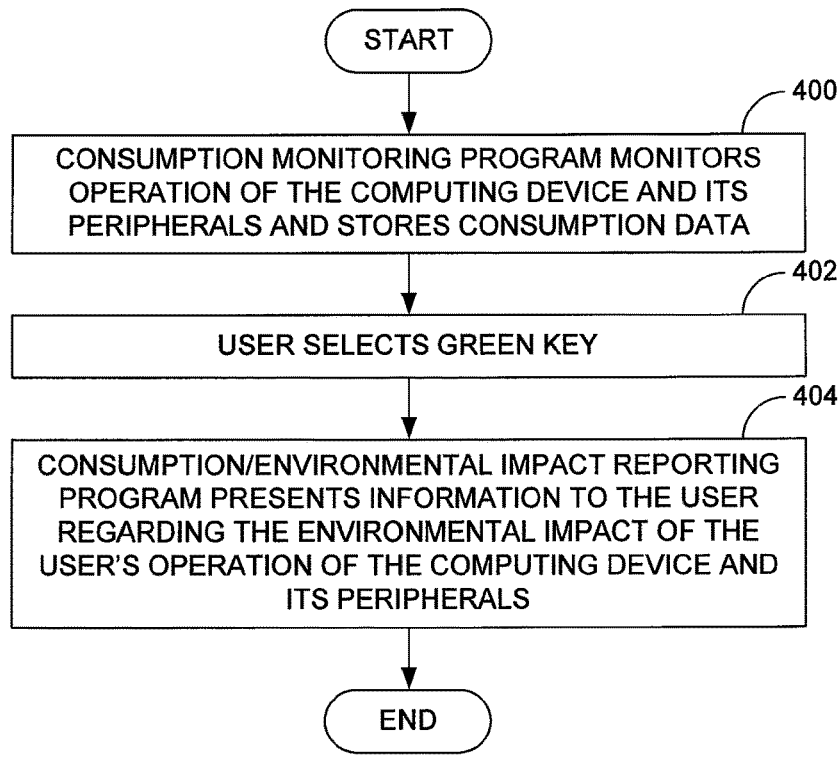
FIG. 4 is a flow diagram of an embodiment of a method for providing a user with information regarding resource consumption or environmental impact associated with use of the computing device.

Referring next to FIG. 4, illustrated is an embodiment of a method for providing a user with information regarding resource consumption or environmental impact associated with use of the computing device. Beginning with block 400, a consumption monitoring program that executes on a computing device monitors operation of the computing device and its peripherals and stores consumption data. In some embodiments, the consumption monitoring program continuously accumulates and stores power consumption data, including the power draw of the components of the computing device during active use and during periods of inactivity (i.e., active and passive power consumption), the amount or percentage of time the computing device operates in a hibernation mode in which certain components are powered down during periods of inactivity, the amount or percentage of time the computing device operates in sleep mode in which the display is powered down during periods of inactivity, the amount or percentage of time the processor is operating, usage of peripherals (e.g., printers) and the consumption of resources (e.g., paper) associated with that use, and any other information relevant to the consumption of resources in association with operation of the computing device and its peripherals.

After some duration of such monitoring and storage, a user of the computing device selects the green-key, as indicated in block 402. As described above, the green-key can comprise a physical green-colored key that is included with a keyboard of the computing device. In such a case, selection of the green-key would comprise the user pressing the green-key. Notably, however, the green-key can, in other embodiments, comprise a virtual key or other icon that is presented to the user in the display of the computing device, such as on the virtual desktop or the displayed task bar. In such a case, selection of the green-key would comprise selecting (e.g., double-clicking) the icon using an appropriate pointing device, such as a mouse or a touchpad.

Once the green-key has been selected, the consumption/environmental impact reporting program 314, as indicated in block 404, presents information to the user regarding one or both of the user's consumption of resources and the environmental impact of that consumption associated with the user operation of the computing device and its peripherals. Notably, there is overlap between resource consumption and environmental impact. For example, the consumption of power by computer users in the aggregate increases the amount of electricity that must be generated by power plants, which may use environmentally unfriendly materials, such as coal, to generate that electricity. Furthermore, the consumption of paper by computer users in the aggregate increases the demand for paper and, therefore, can cause further deforestation. It is further noted, however, that information about resource consumption may be of interest to the user independent of environmental concerns. For example, due to rising energy costs, some users may be more concerned with the costs associated with their computer usage practices. Due to the overlap between resource consumption and environmental impact, however, the information presented to the user can simultaneously provide the user with an indication of both aspects phenomena.

As described above, the information provided to the user can be conveyed in the form of a simple graphical representation of how well or poorly the user is doing from an energy conservation or environmental friendliness perspective. In some embodiments, the graphical representation can comprise a graphic image of a tree, with the size or apparent health of the tree reflecting the user's operation of the computing device and its peripherals. By way of example, a small and/or wilting tree can signify high resource consumption and a negative environmental impact, while a tall and/or robust tree can signify low resource consumption and a relatively small environmental impact (or a positive environmental impact). Alternatively, how well or poorly the user is doing with his or her usage can be reflected by a number of trees, with a relatively small number of trees signifying high resource consumption and a negative environmental impact, and a large number of trees (e.g., a forest) signifying low resource consumption and a relatively small environmental impact.

Many variations on the environment-centric graphical representation are possible. For example, the graphical representation could comprise a given number or carbon credits with a greater number of credits signifying good practices and a lower number of credits signifying poor practices. In other embodiments, the graphical representation can focus on energy consumption or costs as opposed to environmental impact. For example, the graphical representation could comprise a number of light bulbs, with a greater number of bulbs signifying high power consumption and therefore poor practices and a lower number of bulbs signifying low power consumption and cost and therefore good practices. As a further example, the graphical representation could comprise stacks of currency (e.g., dollar bills) or gold coins with large stacks bills signifying high power consumption and cost and high costs and therefore poor practices and smaller stacks signifying low power consumption and low costs and therefore good practices. In some embodiments, the type of graphical representation presented can be chosen by the user as a configuration setting.

Irrespective of the form of the information that is presented to the user, the user can quickly develop an appreciation of how well or poorly the user is operating his computing device and peripherals from a resource consumption or environmental impact standpoint. Assuming the user believes there is room for improvement, the user can then change his or her computer usage practices and, after the passage of time (e.g., one or a few weeks), the user can again select the green-key to see if there is any improvement due to the adoption of better usage practices.

Figure 5A:
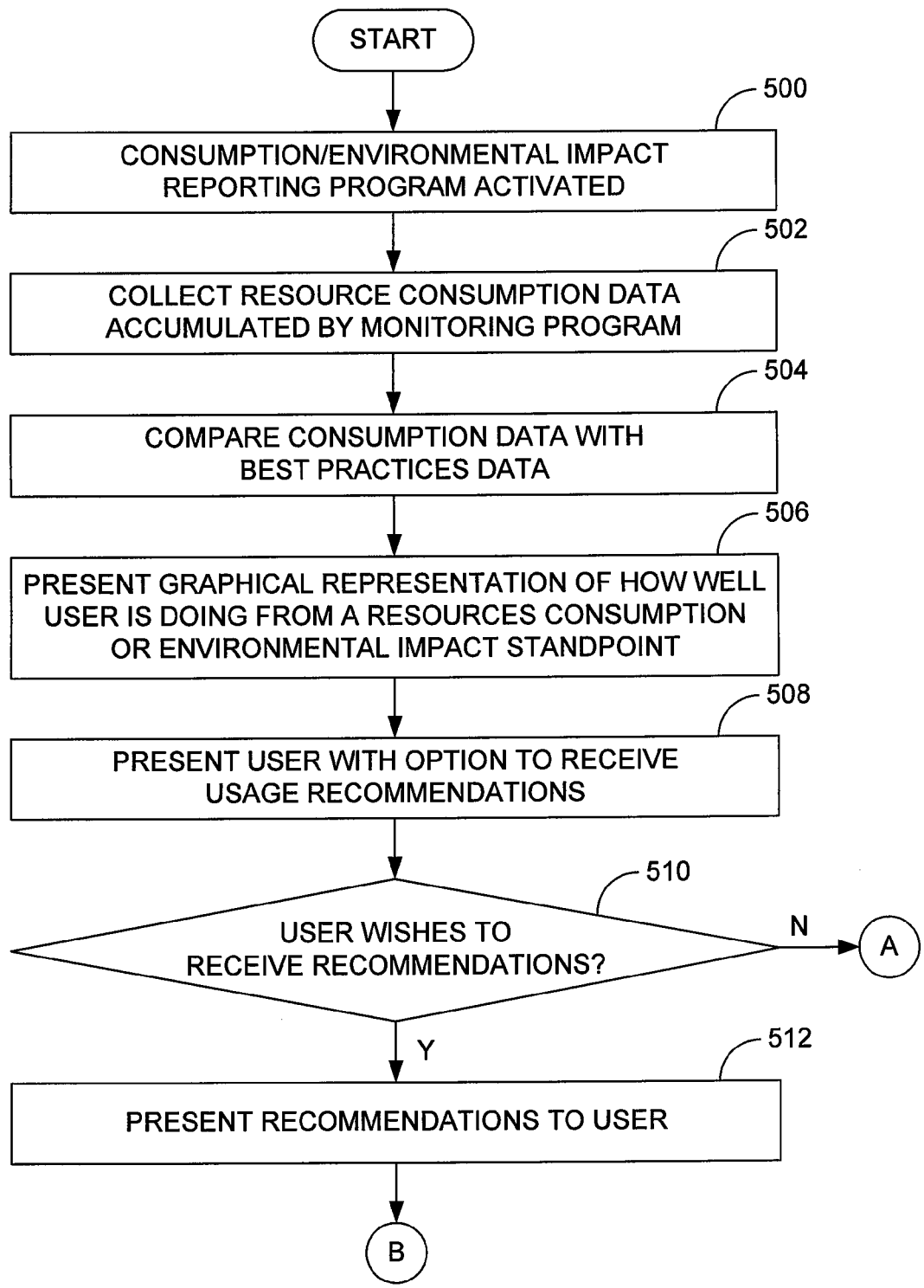
FIGS. 5A and 5B together comprise a flow diagram that illustrates an example of operation of a consumption/environmental impact reporting program.
Figure 5B:
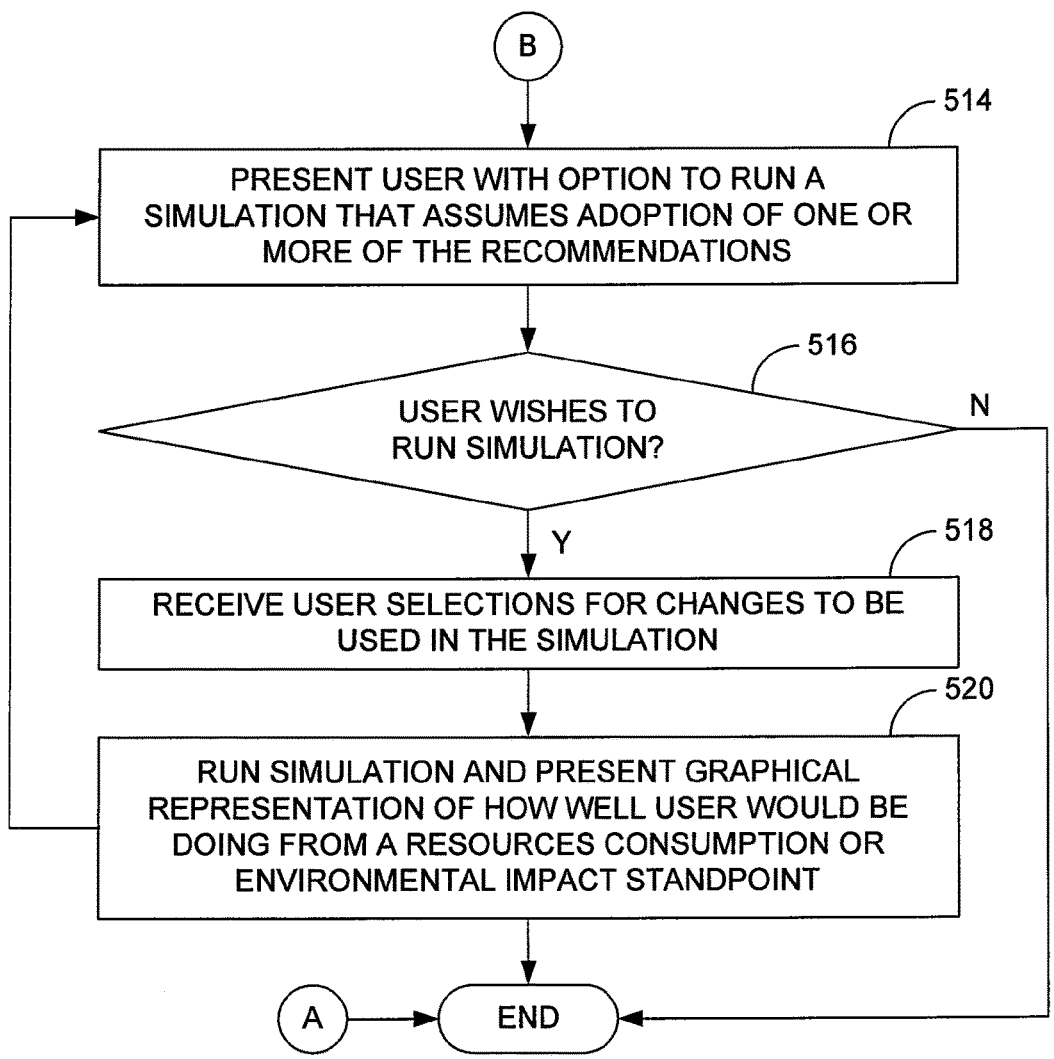

FIGS. 5A and 5B illustrate an example of operation of the consumption/environmental impact reporting program 314 identified in FIG. 3. Beginning with block 500 of FIG. 5A, the consumption/environmental impact reporting program 314 is activated. As described above, such activation can occur in response to the green-key being selected by the user. Next, as indicated in block 502, the reporting program 314 collects resource consumption data that has been accumulated by the monitoring program. In some embodiments, the consumption data is contained in a table that is populated by the monitoring program. Regardless, the data provides an indication of resource consumption by the computing device and its peripherals. In some embodiments, the reporting program 314 collects only recent data from the table, for example, that accumulated over the last month or week. In some embodiments, the period of time to be used can be selected by the user as a configuration setting.

Once the reporting program 314 collects the consumption data, it compares that data to best practices data, as indicated in block 504. In some embodiments, the best practices data can be stored in a database within local memory of the computing device and echoes best practices established by a relevant authoritative or governing body. By way of example, the best practices data incorporates the 80 PLUS standard established by the U.S. Department of Energy. Irrespective of the basis for the best practices data, that data identifies the usage practices that are considered useful in conserving resources and/or reducing environmental impact without being unduly restrictive. The comparison can take into consideration various specific practices followed by the user. For example, the reporting program can consider how quickly the user's computing device goes into a hibernation mode, how long the user's computing device sits idle while plugged into a wall outlet (and therefore passively consumes power), how many pieces of paper are consumed by the user during printing, and so forth. Each of those practices can be individually compared with an associated best practice to gauge how well the user conserving resources or controlling his or her environmental impact.

Figure 6A:
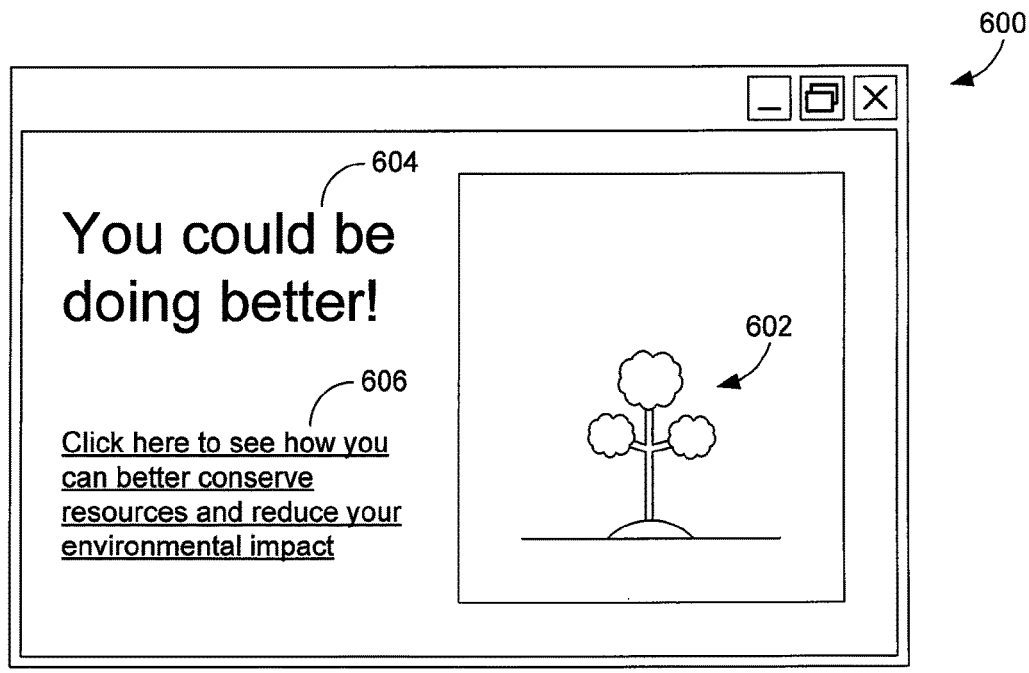
FIGS. 6A and 6B are schematic depictions of a graphical user interface that can be presented to a user.
Figure 6B:
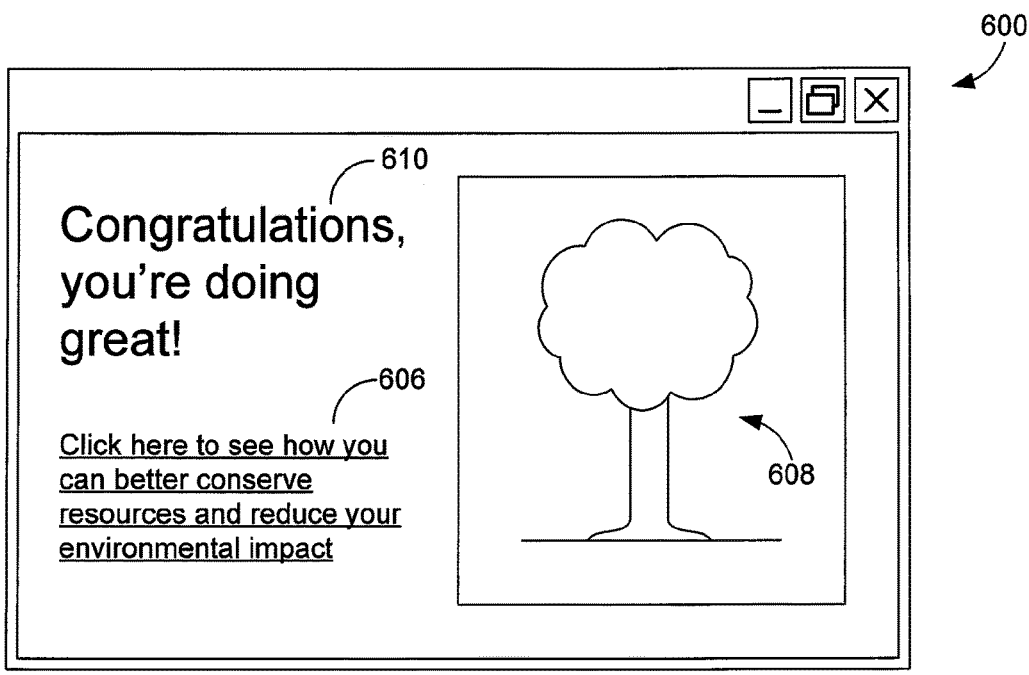

Once the various comparisons have been made, the reporting program 314 presents the user with a graphical representation of how well the user is doing from a resources consumption or environmental impact standpoint, as indicated in block 506. In some embodiments, the user is presented with a graphical user interface in the form of a dialog box that includes the graphical representation. FIGS. 6A and 6B illustrate such a dialog box 600. With reference to FIG. 6A, the dialog box 600 includes a graphical image of a tree 602, which can as represent the impact of the user's practices on the environment. In the example of FIG. 6A, the tree 602 is a mere sapling and therefore conveys room for improvement. In addition, the dialog box 600 includes a message 604 that states "You could do better" to underscore the message conveyed by the sapling.

With reference back to FIG. 5A, the user can further be presented with the option to receive usage recommendations that would reduce the user's resource consumption or environmental impact (block 508). As indicated in FIG. 6A, such an option can be presented in the dialog box 600 as a selectable link 606 to information as to how the user can improve his or her computer usage practices. With reference to decision block 510 of FIG. 5A, if the user does not wish to receive such recommendations, flow is terminated for the session. If, on the other hand, the user wishes to receive recommendations, flow continues to block 512 at which the recommendations are presented to the user, for example in the dialog box 600. The nature of the recommendations will depend upon the user's particular computer usage practices and, specifically, upon those practices upon which the user could improve and/or that would have the greatest impact. Therefore, if, for example, the user does not have his or her computing device set to automatically go into hibernation mode after sitting idle for several minutes, the reporting program 314 could recommend a setting change to the user that would cause hibernation or occur sooner. In some embodiments, if the user tends to leave his or her desktop computer running for many hours when not being used, the reporting program 314 could recommend shutting the computer down when imminent use is not foreseen. Another recommendation could be to unplug a notebook computer when it is not being used to reduce its passive power consumption and extend its battery life. Yet another recommendation could be to reduce boot time to reduce processor power consumption. Yet another recommendation could be to replace an outdated computer if newer computers are significantly more energy efficient.

Irrespective of the recommendations that are provided, the user can then be presented with the option of running a simulation that assumes adoption of one or more of the recommendations, as indicated in block 514 of FIG. 5B. With reference to decision block 516, if the user does not wish to run such a simulation, flow for the session is terminated. If, however, the user does wish to run the simulation, the user's selections for changes to be used in the simulation are received, as indicated in block 518, and the reporting program 314 runs the simulation and presents a further graphical representation to the user, as indicated in block 520. Assuming the changes the user selected have a significant impact on resource consumption or the environment, the graphical representation will reflect a significant improvement. Such an improvement is depicted in FIG. 6B, which in contrast to the small sapling 602 of FIG. 6A depicts a mature tree 608 and further includes a message 610 that states "Congratulations, you're doing great!" The improvement in the graphical representation not only provides a clear indication of how much better the user could do but further provides motivation to the user to change his or her computer usage practices.

Assuming the user makes changes to his or her computer usage practices, the user should see similar signs of improvement when the green-key is selected in the future. Therefore, with each coming week or month, the user can watch his tree grow tall and healthy, providing the user both with feedback as to how the user has improved in terms and a feeling of accomplishment. It is hoped that such feedback and that feeling of accomplishment will inspire computer users to operate their computers in a more conservation minded and environmentally friendly way that, in the aggregate, will have a significant impact on preserving the planet's resources and environmental health.

Figure 7:
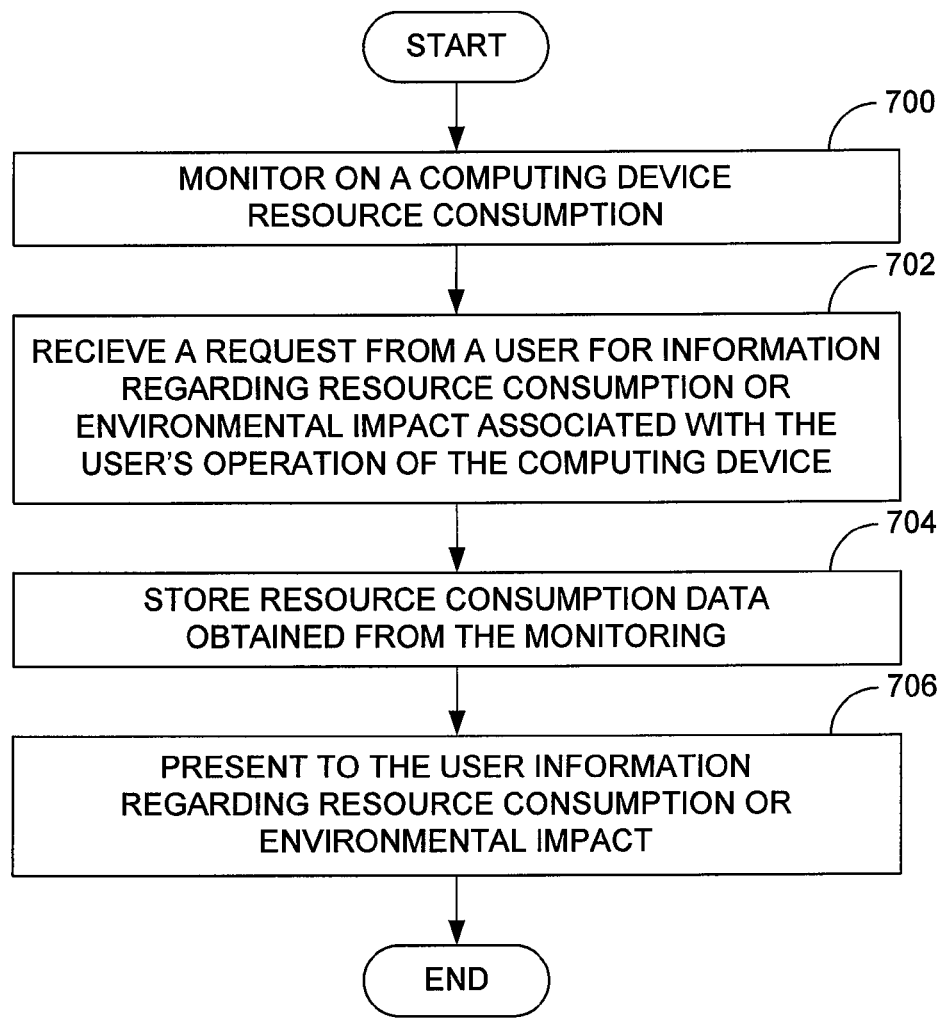
FIG. 7 is a flow diagram of a further embodiment of a method for providing a user with information regarding resource consumption or environmental impact associated with use of the computing device.

FIG. 7 illustrates a further method for providing a user with information regarding resource consumption or environmental impact associated with use of the computing device. The method comprises monitoring on a computing device resource consumption (block 700), storing resource consumption data obtained from the monitoring (block 702), receiving a request from the user for information regarding resource consumption or environmental impact associated with the user's operation of the computing device (block 704), and presenting to the user information regarding resource consumption or environmental impact (block 706).

The invention claimed is:

1. A computing device comprising:
a processor; and
memory storing code executable by the processor to:
monitor resource consumption of the computing device pertaining to a user's operation of the computing device;
in response to a user action on the computing device requesting information regarding resource consumption of the computing device, present information regarding the paper and electrical resource consumption to the user, the information comprising a graphical representation comparing the electrical resource consumption data with best practices data stored in a database within the memory, wherein the best practice data is a target energy efficiency of a national standard; and
provide a recommendation to the user regarding how the user can reduce the resource consumption.

2. The computing device of claim 1, wherein the computing device comprises a laptop computer, and wherein the recommendation is directed to extending battery life of a battery of the laptop computer.

3. The computing device of claim 1, wherein the code executable by the processor to receive a request from the user for the information via selection by the user of a key, wherein the key comprises a dedicated environmental physical key of a keyboard of the computing device.

4. The computing device of claim 1, wherein to provide the recommendation is in response to the user opting to receive the recommendation, and wherein the recommendation is directed to at least one of reducing the resource consumption, reducing cost of the operation of the computing device, or extending battery life of a battery of the computing device.

5. The computing device of claim 1, comprising a display, wherein the resource consumption comprises consumption of electricity by the display, the processor, and the memory.

6. The computing device of claim 1, wherein the information comprises environmental impact associated with the resource consumption, wherein the graphical representation indicates how well the user is limiting environmental impact associated with the resource consumption, and wherein the code executable to run a simulation adopting the recommendation in response to the user requesting the simulation.

7. The computing device of claim 1, wherein the computing device comprises a desktop computer, wherein the processor comprises a central processing unit (CPU), and wherein the recommendation comprises to replace the computing device in response to availability of a newer computing device that is more energy efficient than the computing device.

8. A method by a computing device, comprising: monitoring, by the computing device, resource consumption of the computing device associated with a user's operation of the computing device; storing, by the computing device, resource consumplion data obtained from the monitoring; receiving, by the computing device, a request from the user for information regarding the resource consumption; presenting, by the computing device, the information to the user, wherein the information comprises a graphical representation comparing the resource consumption data with best practices data stored in a database within the memory, wherein the best practice data is a target energy efficiency of a national standard; and providing by the computing device, a recommendation to the user regarding how the user can reduce the resource consumption.

9. The method of claim 8, wherein receiving the request from the user comprises receiving the request via selection by the user of a key, wherein the key comprises a dedicated environmental virtual key or dedicated environmental icon displayed on a display of the computing device.

10. The method of claim 8, comprising detecting the user opting to receive the recommendation, wherein the information comprises environmental impact associated with the resource consumption, and wherein the graphical representation indicates how well the user is limiting environmental impact associated with the resource consumption.

11. The method of claim 8, wherein the resource consumption comprises energy consumption, and wherein providing the recommendation is in response to the user opting to receive the recommendation.

12. The method of claim 8, wherein the computing device is a laptop computer, and wherein the recommendation is directed to extending battery life of a battery of the laptop computer.

13. The method of claim 8, wherein the computing device comprises a display, internal components, and a housing surrounding the internal components, the internal components comprising a processor and memory, wherein the resource consumption comprises energy consumption of the display, the processor, and the memory, and wherein the recommendation is directed to reducing electrical consumption of at least one of the display, the processor, or the memory.

14. The method of claim 8, wherein the computing device comprises a desktop computer, and wherein the resource consumption comprises paper consumption by a printer associated with the computing device.

15. The method of claim 8, wherein the computing device comprises a personal computer or a notebook computer, and wherein presenting the information comprises running a simulation.

16. A non-transitory computer-readable medium comprising logic executable by a computing device to:
monitor resource consumption of the computing device associated with a user's operation of the computing device;
store resource consumption data of the resource consumption;
receive at the computing device a request, based on a user action on the computing device, for information regarding the resource consumption;
present to the user, in response to the request based on the user action, paper and electrical resource consumption and a graphical representation comparing the electrical resource consumption data with best practices data stored in a database within the memory in response to the request, wherein the best practice data is a target energy efficiency of a national standard; and provide a recommendation to the user regarding how the user can reduce the resource consumption.

17. The computer-readable medium of claim 16, wherein to receive the request comprises to detect selection by the user of an environmental icon of the computing device.

18. The computer-readable medium of claim 16, wherein the resource consumption comprises energy consumption of components of the computing device, the components comprising a display and internal components, the internal components comprising a processor and memory surrounded by a housing of the computing device, and wherein the logic executable to run a simulation that adopts the recommendation.

* * * * *

UNITED STATES PATENT AND TRADEMARK OFFICE
CERTIFICATE OF CORRECTION

| | |
|---|---|
| PATENT NO. | : 10,317,975 B2 |
| APPLICATION NO. | : 15/357422 |
| DATED | : June 11, 2019 |
| INVENTOR(S) | : Bruce David Michelson |

Page 1 of 1

It is certified that error appears in the above-identified patent and that said Letters Patent is hereby corrected as shown below:

In the Drawings

In sheet 2 of 6, FIG. 3, reference numeral 316, Line 1, delete "DBASE" and insert -- DATABASE --, therefor.

In the Claims

In Column 8, Line 3, Claim 8, delete "consumplion" and insert -- consumption --, therefor.

Signed and Sealed this
Third Day of September, 2019

Andrei Iancu
*Director of the United States Patent and Trademark Office*